United States Patent
Zhang et al.

(10) Patent No.: US 11,860,187 B2
(45) Date of Patent: Jan. 2, 2024

(54) MODIFIED METHOD TO FIT CELL ELASTIC MODULUS BASED ON SNEDDON MODEL

(71) Applicant: DALIAN UNIVERSITY OF TECHNOLOGY, Liaoning (CN)

(72) Inventors: Wei Zhang, Liaoning (CN); Weihao Sun, Liaoning (CN); Chengwei Wu, Liaoning (CN); Jianli Ma, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 341 days.

(21) Appl. No.: 17/280,552

(22) PCT Filed: Sep. 7, 2020

(86) PCT No.: PCT/CN2020/113672
§ 371 (c)(1),
(2) Date: Mar. 26, 2021

(87) PCT Pub. No.: WO2022/000768
PCT Pub. Date: Jan. 6, 2022

(65) Prior Publication Data
US 2022/0043025 A1 Feb. 10, 2022

(30) Foreign Application Priority Data
Jul. 2, 2020 (CN) .......................... 202010624625.0

(51) Int. Cl.
*G01Q 60/28* (2010.01)
*G06F 30/23* (2020.01)
(Continued)

(52) U.S. Cl.
CPC ............. *G01Q 60/28* (2013.01); *G01N 15/10* (2013.01); *G01Q 30/04* (2013.01); *G01Q 60/366* (2013.01);
(Continued)

(58) Field of Classification Search
CPC ...... G01Q 60/28; G01Q 30/04; G01Q 60/366; G01Q 60/24; G01N 15/10; G06F 30/23;
(Continued)

(56) References Cited

U.S. PATENT DOCUMENTS

2005/0081608 A1* 4/2005 Shoelson ............. G01Q 60/366
73/105
2017/0038410 A1* 2/2017 Serry ..................... G01Q 60/32

FOREIGN PATENT DOCUMENTS

CN 103674813 A 3/2014
CN 104251810 A 12/2014
(Continued)

OTHER PUBLICATIONS

Kim, Yeongjin, Jennifer H. Shin, and Jung Kim. "Atomic force microscopy probing for biomechanical characterization of living cells." 2008 2nd IEEE RAS & EMBS International Conference on Biomedical Robotics and Biomechatronics. IEEE, 2008. (Year: 2008).*

(Continued)

*Primary Examiner* — Michael Edward Cocchi
(74) *Attorney, Agent, or Firm* — Muncy, Geissler, Olds & Lowe, P.C.

(57) ABSTRACT

This invention belongs to the technical field of cell mechanics and provides a modified method to fit cell elastic modulus based on Sneddon model. The process of the conical atomic force microscope probe compressing into the cell was simulated by ABAQUS. The simulation results are compared with the Sneddon model to get the error caused by (Continued)

Sneddon model. The fitting errors of Sneddon model under different circumstances were obtained by using the method of function fitting, so as to realize the modification of Sneddon model to fit cell elastic modulus. As a modified method to fit cell elastic modulus based on Sneddon model, it can be used to measure the elastic modulus of cells more accurately. The design process is convenient and fast. The design method is easy to master, and the process of use is convenient and simple.

1 Claim, 5 Drawing Sheets

(51) Int. Cl.
*G01N 15/10* (2006.01)
*G01Q 60/24* (2010.01)
*G01Q 30/04* (2010.01)
*G01Q 60/36* (2010.01)
*G06F 119/14* (2020.01)

(52) U.S. Cl.
CPC ............. *G06F 30/23* (2020.01); *G01Q 60/24* (2013.01); *G06F 2119/14* (2020.01)

(58) Field of Classification Search
CPC ...... G06F 30/25; G06F 30/367; G06F 30/398; G06F 2119/14; G06F 30/20
See application file for complete search history.

(56) References Cited

FOREIGN PATENT DOCUMENTS

| | | |
|---|---|---|
| CN | 106199078 A | 12/2016 |
| CN | 106769471 A | 5/2017 |
| CN | 107228838 A | 10/2017 |
| CN | 109884344 A | 6/2019 |
| GB | 2472302 A | 2/2011 |
| JP | 2018040759 A | 3/2018 |

OTHER PUBLICATIONS

Gavara, Núria et al. "Determination of the elastic moduli of thin samples and adherent cells using conical atomic force microscope tips," Nature nanotechnology, Nature Publishing Group Sep. 30, 2012, vol. 7, Issue No. 11, pp. 733-736.

Ding, Yue, "On the determination of elastic moduli of cells by AFM based indentation," Scientific Reports, No. 45575, Mar. 4, 2017, pp. 1-8.

* cited by examiner

MODIFIED METHOD TO FIT CELL ELASTIC MODULUS BASED ON SNEDDON MODEL

TECHNICAL FIELD

The invention belongs to the technical field of cell mechanics, and especially relates to the use of atomic force microscope (AFM) to measure the elastic modulus of cells. The modified method to fit cell elastic modulus based on Sneddon model can be used to extract the elastic modulus of cells more accurately.

BACKGROUND

The elastic modulus of cells changes significantly during cell growth, development, maturation, proliferation, senescence, death and pathological changes. For example, the elastic modulus and viscoelasticity of healthy red blood cells is much greater than that of patients with sickle cell anemia. The elastic modulus of healthy breast cells is more than twice that of breast cancer cells, and the elastic modulus of benign breast tumor cells is 1.4-1.8 folds that of malignant breast cancer cells. The accurate measurement of the elastic modulus of cells is of significant importance for the development of cell mechanics, and the research and development of new methods for disease diagnosis and treatment based on mechanical principles.

When conical AFM probes are used to measure the elastic modulus of cells, Sneddon model is widely used for fitting the result. The formula of Sneddon model is expressed as:

$$P = \frac{2}{\pi} d^2 \frac{E}{1-v^2} \tan\alpha \qquad (1)$$

Where, P is the force applied in the normal direction, α is the half angle of the rigid conical tip, d is the depth of the rigid conical tip compressed into the elastic half space, E is the elastic modulus of the elastic half space, and v is the Poisson's ratio of the elastic half space. When AFM was used to measure the elastic modulus of cells, the relationship curve between normal force P and compression depth d was obtained, and then the Sneddon model was used to fit the curve with the standard least square method to obtain the elastic modulus of cells.

However, there are two important assumptions in Sneddon model: (1) The contact deformation must be small. (2) The curvature radius of the rigid tip of the probe is 0. In practical experiments, AFM probes are usually compressed into cells at depths ranging from tens to hundreds of nanometers, which cannot be considered as small deformations compared to the thickness of several microns of adherent cells. In addition, due to the limitation of machining accuracy, the curvature radius of AFM probe tip can not be 0, which is generally 20-60 nm. The above inconsistency between experiment and the hypothesis of Sneddon model means there will be significant errors when the Sneddon model is used to fit experimental data, which will make the obtained elastic modulus deviate from the eigenvalue, presenting a great challenge for accurate measurement of the elastic modulus of cells.

When the conical AFM probe is under the action of normal force, the contact area and compression depth between the conical AFM probe and the cell increase with the increase of external force, which is a problem of nonlinear contact and large deformation. As ABAQUS has powerful mechanical simulation capabilities to solve complex nonlinear problems, ABAQUS was chosen to simulate the compression process of the conical AFM probe into the cell.

The invention uses ABAQUS to simulate the process of compressing a conical AFM probe into cells, and considers the influence of the curvature radius of conical AFM probe, half angle of the cone and the compression depth of the probe on the elastic modulus, and simulates the relationship between the force P and the compression depth d, so as to obtain the error generated by the Sneddon model fitting. Finally, through numerical fitting, the function among error and the geometry parameters of the conical AFM probe and the compression depth is obtained, and a modified formula is proposed, which can more accurately characterize the elastic modulus of cells.

SUMMARY OF THE INVENTION

The invention provides a modified method to fit cell elastic modulus based on Sneddon model. ABAQUS is used to simulate the process of the conical AFM probe being compressed into the cell. The simulation results are compared with the Sneddon model, and the errors generated by Sneddon model are obtained. The fitting errors of Sneddon model under different circumstances are obtained by the method of function fitting, so as to realize the modification of Sneddon model to fit cell elastic modulus.

The Technical Solution of the Invention

A modified method to fit cell elastic modulus based on Sneddon model include the following steps:

1. The Design of Shape Parameters of the Conical AFM Probe

Axisymmetric models of cells and conical AFM probes are established in ABAQUS. The cells are set as deformable elastomers with the elastic modulus of 5 kPa and a Poisson's ratio of 0.3. The conical AFM probes are set as rigid body. The shape parameters of the conical AFM probe are set by changing the half angle of the cone α and the curvature radius of the cone at the tip r, where the half angle of the cone is selected from 20°~60°, and the curvature radius of the cone at the tip is selected from 20 nm~60 nm.

2. The Finite Element Simulation Analysis of the Cells and the Models of Conical AFM Probes with Different Shapes that Designed in the First Step 2.1 Simulation of the Relationship Between the Normal Force of a Conical AFM Probe and the Compression Depth When the conical AFM probe is under normal force, the contact area and compression depth of the conical AFM probe increase with the increase of external force, which is a problem of nonlinear contact and large deformation. ALE (Arbitrary Lagrangian Eulerian) method in ABAQUS is used to simulate the cell deformation under external force. The contact is set as surface to surface contact. The master surface is the side on which the conical AFM probe contacts with the cell, and the slave surface is the upper surface of the cell. The grid convergence is analyzed, and then the grid size is determined for calculation. The relationship between the normal force and displacement of the conical AFM probe is extracted.

2.2 The Error Analysis of the Simulation Results and Sneddon Model

The relative error can effectively demonstrate the deviation degree between the Sneddon model fitting results and the ABAQUS simulation results. The normal force of the conical AFM probe obtained from 2.1 is compared with the results of Sneddon model at the same compression depth and substituted into the following equation:

$$\delta = \frac{P - P_s}{P_s} \quad (2)$$

The relative error in elastic modulus based on Sneddon model fitting is calculated. Where, δ is the relative error in the elastic modulus of the cell based on the Sneddon model fitting, P is the normal force exerted on the conical AFM probe simulated by ABAQUS, and $P_s$ is the normal force exerted on the conical AFM probe calculated by Sneddon model. Because there exists the first order relationship between the normal force of the conical AFM probe and the elastic modulus of the cell in the formula of Sneddon model, the relative error of the normal force is equal to the relative error of the elastic modulus.

3 The Function Fitting of the Relative Error Calculated in the Second Step

The relative error of the conical AFM probe with sufficient shape parameters calculated in the second step are fitted as a function. During data consolidation, it is found the relative errors have the linear relationship with the ratio between the curvature radius of the cone at the tip and the compression depth r/d. The relative error should also be a dimensionless quantity. Considering these two points and the simplicity of the result of the fitting formula, the relative error δ is fitted in the form of polynomial functions of r/d and α rather than in the form of Fourier series. The highest exponent of r/d in the polynomial is 1.

Experimental Verification of the Fitting Function Obtained Above:

First of all, the Sneddon model is modified by the fitting function of relative error obtained in the third step to get the modified formula. Secondly, the force displacement curves of human osteosarcoma cells (MG63) are measured using AFM probes with two shape parameters. The Sneddon model and the modified formula are used to fit the elastic modulus of the cells. By comparison, it is found that the elastic modulus fitted by Sneddon model increases greatly with the decrease of the compression depth, while the elastic modulus fitted by the modified formula changes marginally with the change of the compression depth. Then, the force displacement curves of polyvinyl alcohol (PVA) hydrogels are tested with AFM probes of two shapes. Sneddon model and modified formula are used to fit the elastic modulus of hydrogels, and then compared with the macroscopic elastic modulus of hydrogels obtained from macroscopic compression test on universal testing machine. By comparison, it is found that there is an error between the elastic modulus fitted by Sneddon model and the elastic modulus obtained by macro testing, and the error is larger with the smaller compression depth. However, the elastic modulus fitted by the modified formula agrees well with the elastic modulus obtained by macro testing, and the error has no obvious change with compression depth. The above experiments on PVA hydrogel and human osteosarcoma cells verify the accuracy of the fitting function obtained in the third step.

Beneficial effects of the invention: This invention provides a modified method to fit cell elastic modulus based on Sneddon model. Using ABAQUS, which can solve complex nonlinear problems, the compression process of AFM probe into cells is simulated by finite element method, and the mesh convergence is analyzed. By changing the shape parameters of the conical AFM probe (curvature radius of the cone at the tip and half angle of cone) and the compression depth, the relative errors generated by Sneddon model fitting are calculated when the cone of different shapes are pressed into different depths. The error in fitting the elastic modulus of cells using Sneddon model is obtained by means of function fitting. The modified Sneddon model can be used to measure the elastic modulus of cells more accurately. The design process is convenient and fast and the design method is easy to master. And the process of use is convenient and simple.

DETAILED DESCRIPTION

The specific embodiments of the present invention will be further described below in conjunction with the drawings and technical solutions.

Figure 1:
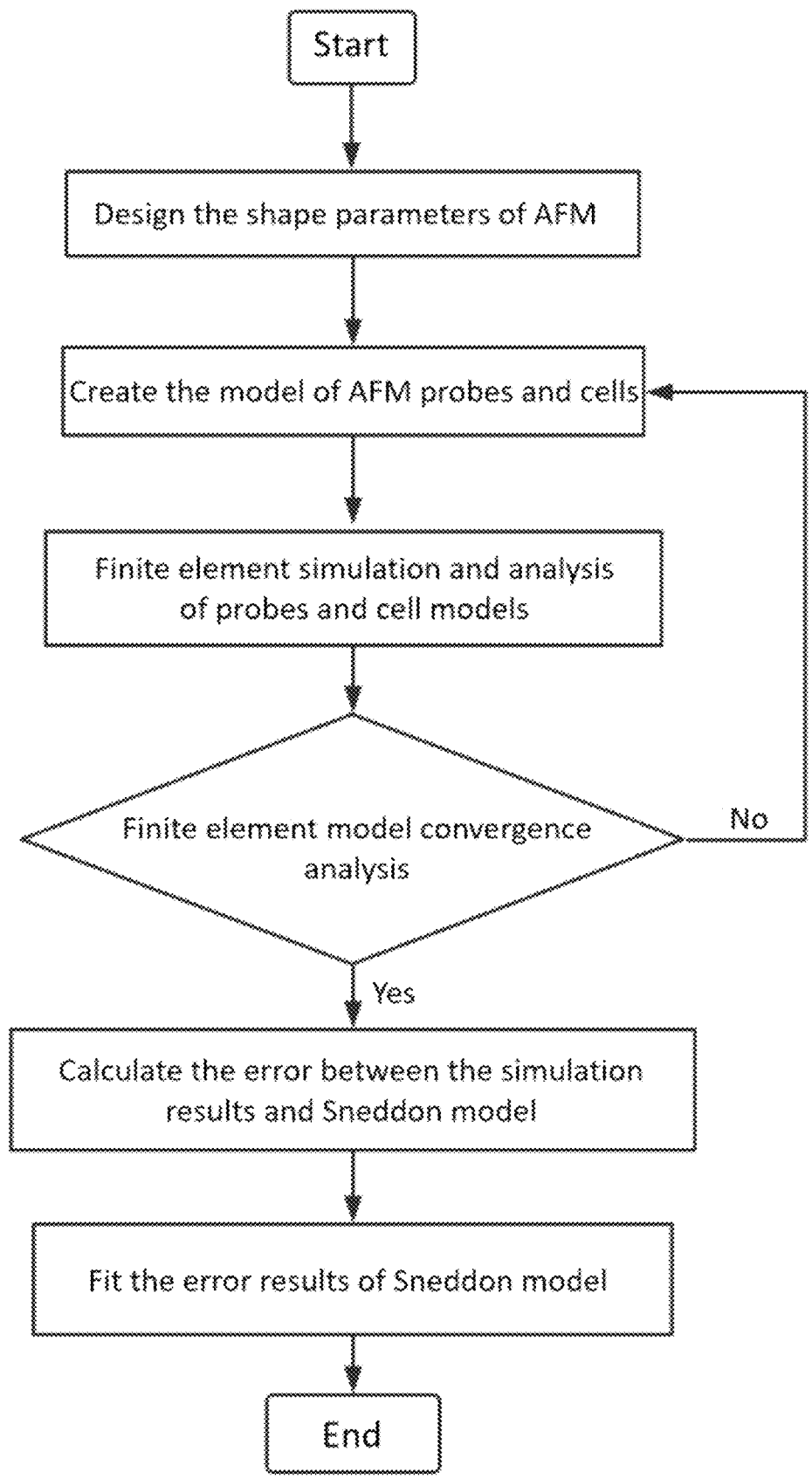
FIG. 1 The design flow chart of the modified method to fit cell elastic modulus based on Sneddon model in the technical implementation scheme.
Figure 2:
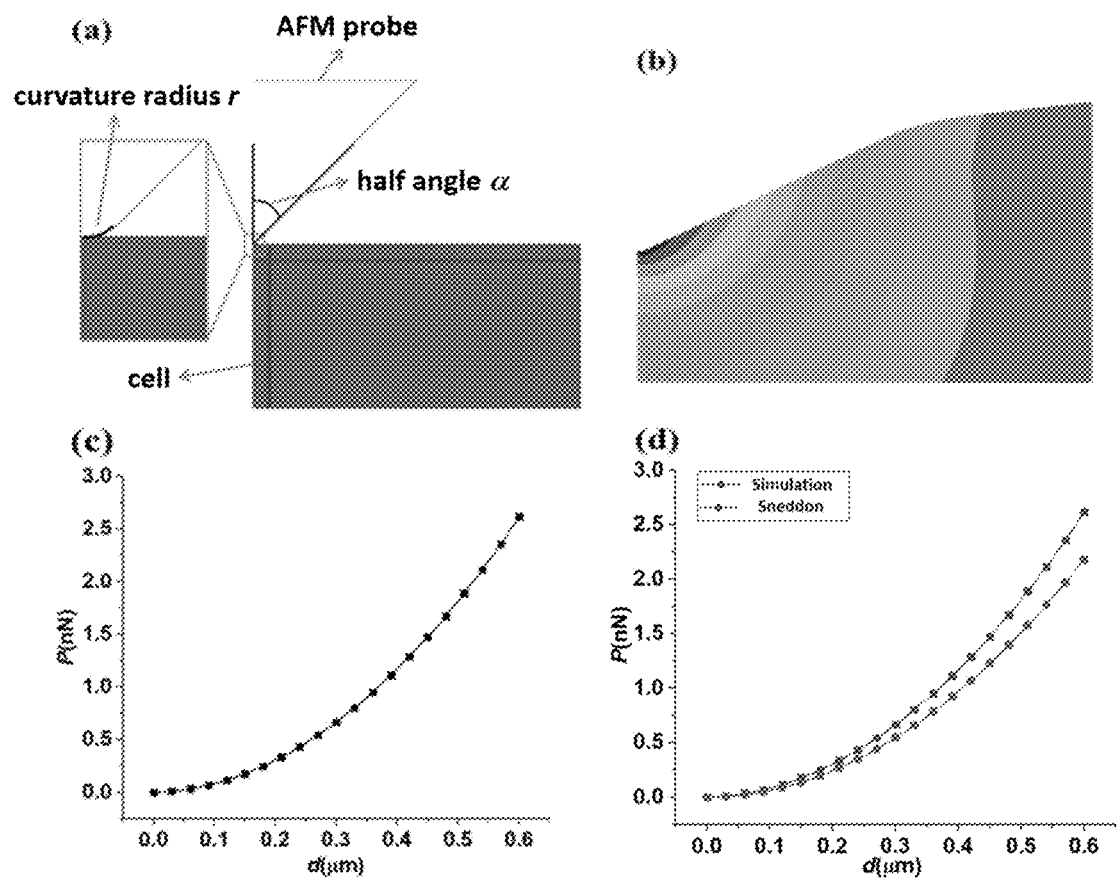
FIG. 2 The numerical simulation process diagram. (a) the deformation solution model established in ABAQUS, (b) the deformation contour of cell, (c) the change of the normal force of the conical AFM probe with the compression depth, (d) the comparison of the simulation results and the Sneddon model fitting results.
Figure 3:
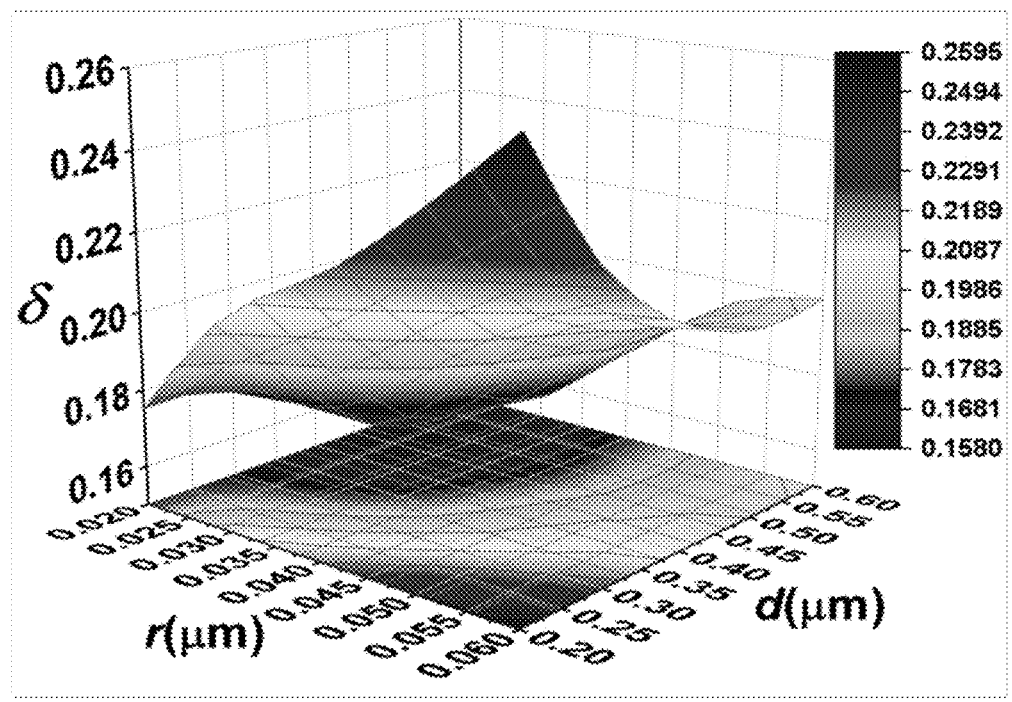
FIG. 3 The relative error of the elastic modulus of cells fitted by Sneddon model when changing the curvature radius of the cone at the tip and compression depth of conical AFM probe with fixed half angle.
Figure 4:
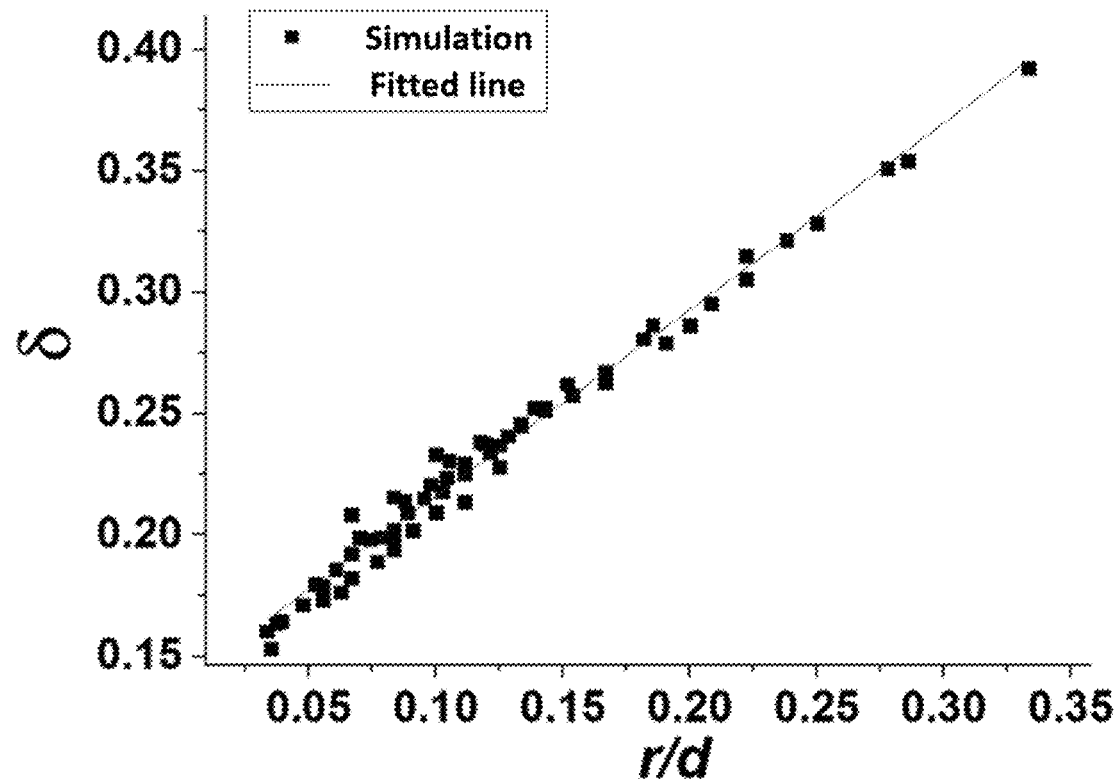
FIG. 4 When r/d is taken as the abscissa, the relation between r/d and relative error δ is approximately linear.
Figure 5:
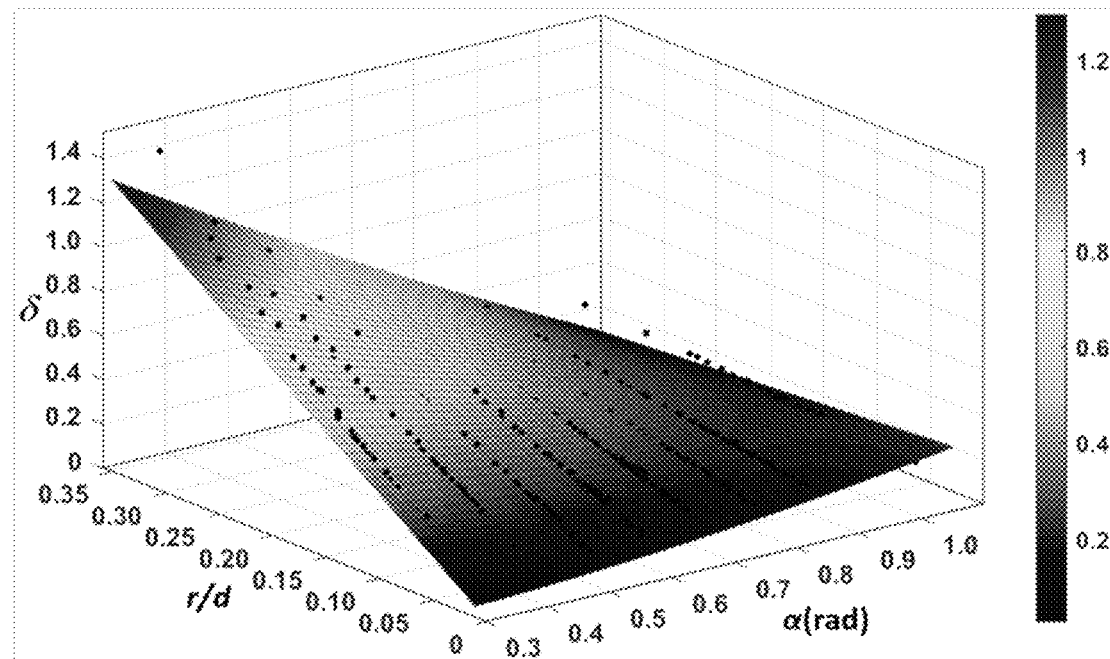
FIG. 5 Polynomial function is used to fitted the errors which will occur when Sneddon model is used to fit the elastic modulus of cells. The probes with different shape parameters are pressed into different depths.
Figure 6:
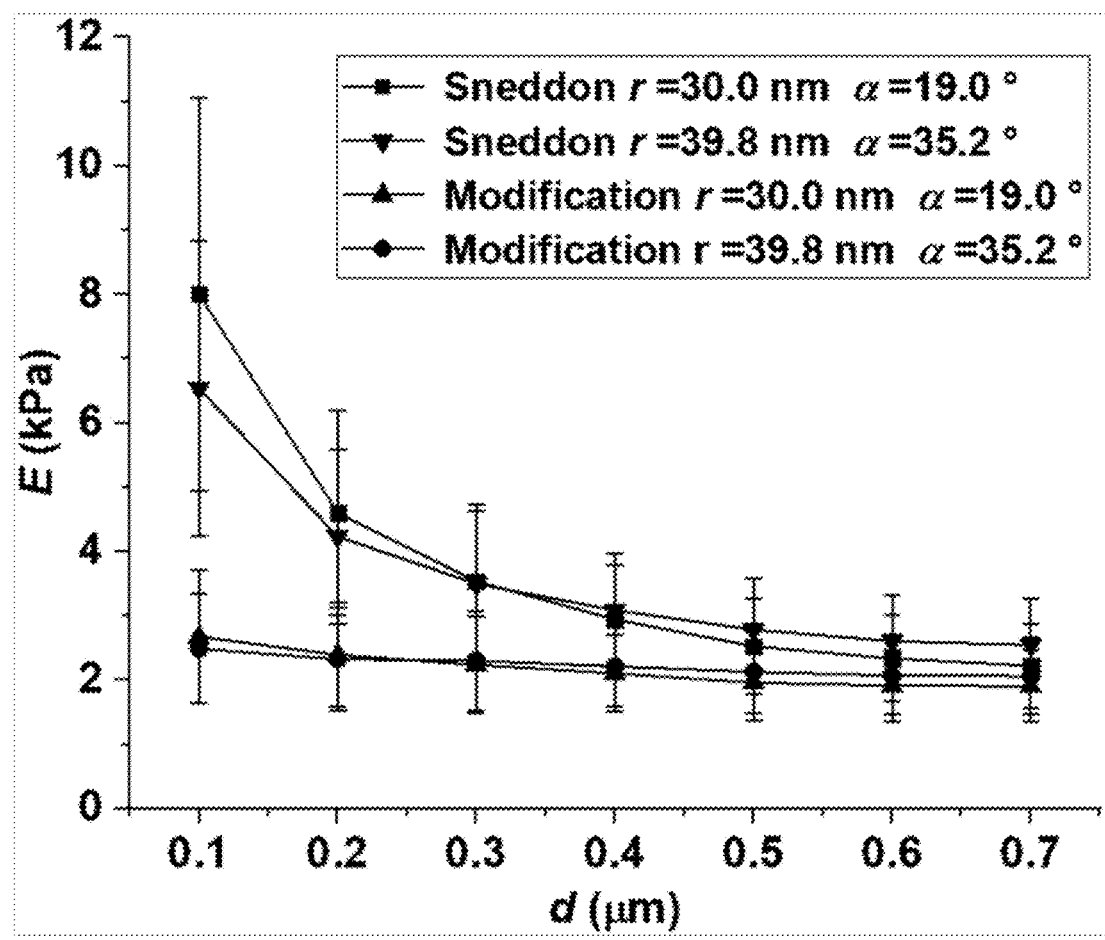
FIG. 6 The verification of the modified model used in the elastic modulus test of human osteosarcoma cells. The force displacement curves of human osteosarcoma cells tested by AFM probe are fitted by Sneddon model and modified model, respectively, then the fitting results of the two formulas are compared.
Figure 7:
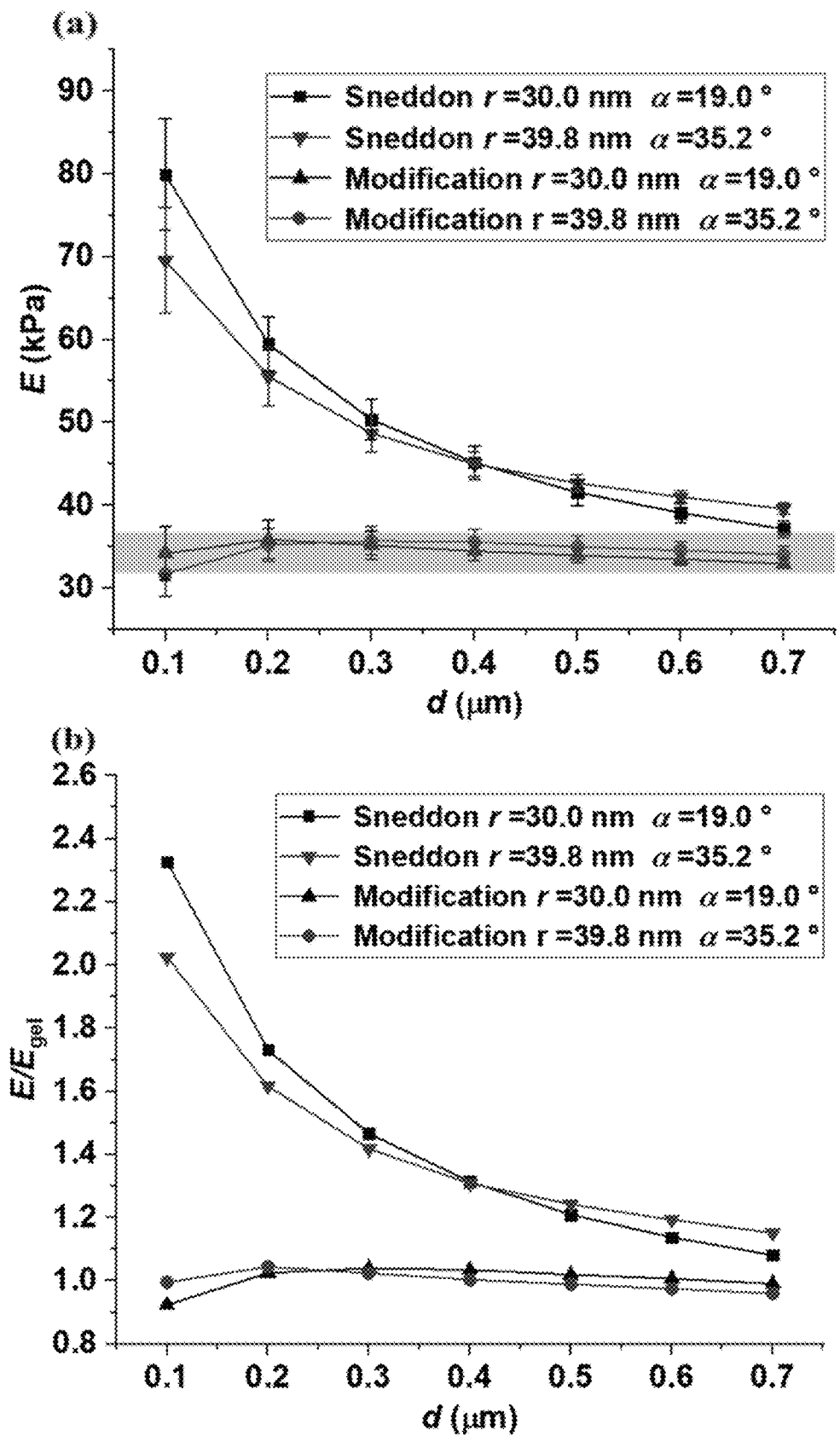
FIG. 7 The validation of the modified model in the elastic modulus test of PVA hydrogels. Sneddon model and the modified model are used to fit the force displacement curves of PVA hydrogel tested by AFM probe and the fitting results are compared with the macroscopic results obtained by the macroscopic compression test. (a) Comparison with the absolute value of the elastic modulus of hydrogels, where the shaded part is the elastic modulus obtained from the macro test. (b) Comparison with the relative ratios of elastic modulus of hydrogels where the relative ratio of the elastic modulus of the hydrogel is the elastic modulus measured by the AFM divided by the elastic modulus measured by the macroscopic test.

FIG. 2 shows the numerical simulation process diagram, wherein (a) shows the deformation solution model established in ABAQUS, (b) shows the deformation contour of cell, (c) shows the change of the normal force of the conical AFM probe with the compression depth, and (d) shows the comparison between the simulation results and the fitted results of Sneddon model. FIG. 3 shows the relative error of the elastic modulus of cells fitted by Sneddon model when changing the curvature radius of the cone at the tip and compression depth of conical AFM probe with fixed half angle. FIG. 4 shows: when r/d is taken as the abscissa, the relation between r/d and relative error δ is approximately linear. FIG. 5 shows that polynomial function is used to fitted the errors which will occur when Sneddon model is used to fit the elastic modulus of cells. The probes with different shape parameters are pressed into different depths. Where, P is the normal force of the AFM probe, a is the half angle of the AFM probe, r is the curvature radius of the AFM probe at the tip, and d is the compression depth of the AFM probe. δ is the relative error between the cell elastic modulus fitted by Sneddon model and the simulation results. FIG. 6 shows the verification of the modified model used in the elastic modulus test of human osteosarcoma cells. The force displacement curves of human osteosarcoma cells tested by AFM probe are fitted by Sneddon model and modified model, respectively, then the fitting results of the two formulas are compared. FIG. 7 shows the validation of the modified model in the elastic modulus test of PVA hydrogels. Sneddon model and the modified model are used to fit the force displacement curves of PVA hydrogel tested by AFM probe and the fitting results are compared with the macroscopic results obtained by the macroscopic compression test. (a) Comparison with the absolute value of the elastic modulus of hydrogels, where the shaded part is the elastic modulus obtained from the macro test. (b) Comparison with the relative ratios of elastic modulus of hydrogels where the relative ratio of the elastic modulus of the hydrogel is the elastic modulus measured by the AFM divided by the elastic modulus measured by the macroscopic test.

Example 1

(1) Firstly, the model of conical AFM probe and cell was established in ABAQUS, as shown in FIG. 2(*a*). The shape parameters of conical AFM probe were set. The shape parameters were designed by changing the half angle of the cone α and the curvature radius of the cone at the tip r. The compression depth d was set as 600 nm, the half angle of the cone α was set as 60°, the curvature radius of the cone at the tip r was set as 20 nm, 30 nm, 40 nm, 50 nm, 60 nm.

(2) Under the action of the external force of the AFM probe, the cells deform along the shape of the AFM probe, and the contact area between the cells and the AFM probe gradually increases, which is a problem of nonlinear contact and large deformation. ABAQUS can solve complex nonlinear problems, so ABAQUS is selected to simulate the deformation of cell under external force. The deformation response under the action of external force was simulated in ABAQUS, as shown in FIG. 2 (*b*). The relationship between the normal force of the conical AFM probe and the compression depth was extracted, as shown in FIG. 2 (*c*). The grid convergence analysis was carried out to verify the effectiveness of the algorithm. The simulation results are shown in FIG. 2 (*d*).

(3) The simulated relationship between the normal force and the compression depth of a conical AFM probe was compared with Sneddon model to calculate the relative error in the elastic modulus of cells based Sneddon model fitting.

(4) Based on the linear relationship between r/d and relative error δ discovered during data consolidation, as shown in the FIG. 4, polynomial function is used to fit the errors which will occur when Sneddon model is used to fit the elastic modulus of cells, as shown in the FIG. 5, where the probes with different shape parameters are pressed into different depths.

(5) Firstly, the Sneddon model is modified by the fitting function of relative error to obtain the modified formula. Secondly, the force displacement curves of human osteosarcoma cells (MG63) were measured using AFM probes with two shape parameters. The Sneddon model and the modified formula were used to fit the elastic modulus of the cells, respectively. By comparison, it is found that the elastic modulus fitted by the Sneddon model increases significantly with the decrease of the compression depth, while the elastic modulus fitted by the modified formula changes marginally with the change of the compression depth, as shown in FIG. 6. Then, the force displacement curves of PVA hydrogels were tested with AFM probes of two shapes. Sneddon model and modified formula were used to fit the elastic modulus of hydrogels, respectively, and then compared with the macroscopic elastic modulus of hydrogels obtained from macroscopic compression test on the universal testing machine. By comparison, it is found that there is an error between the elastic modulus fitted by the Sneddon model and the elastic modulus obtained by the macro test, and the smaller the compression depth is, the greater the error is. The elastic modulus fitted by the modified formula agrees well with the elastic modulus obtained by the macro test, and the error is independent on the compression depth, as shown in FIG. 7. The above experiments on PVA hydrogel and human osteosarcoma cells verify the accuracy of the fitting function obtained in the third step.

The above implementation example only demonstrates the implementation method of the invention and shall not be construed as limiting the scope of the patent for the invention. It should be noted that a number of transformations and improvements may be made by a person skilled in this field without deviating from the conception of the invention, which are within the scope of protection of the invention.

The invention claimed is:

1. A modified method to fit cell elastic modulus based on a Sneddon model, comprising steps of:
   step 1, designing shape parameters of a conical atomic force microscope (AFM) probe,
   establishing axisymmetric models of cells and the conical AFM probe; setting the cells as deformable elastomers with an elastic modulus of 5 kPa and a Poisson's ratio of 0.3; setting the conical AFM probe as a rigid body; setting the shape parameters of the conical AFM probe by changing a half angle of a cone a and curvature radius of the cone at tip r, where the half angle of the cone is selected from 20°~60°, and the curvature radius of the cone at the tip is selected from 20 nm~60 nm;
   step 2, performing finite element simulation analysis of the cells and the models of the conical AFM probe with different shapes designed in step 1;
   2.1) performing a simulation of a relationship between a normal force of the conical AFM probe and a compression depth
   when the conical AFM probe is under the normal force, a contact area and the compression depth of the conical AFM probe increases with increases of an external force, which is a problem of nonlinear contact and large deformation; using Arbitrary Lagrangian Eulerian (ALE) method to simulate a cell deformation under the external force; setting a contact as a surface to surface contact; a master surface is a side on which the conical AFM probe contacts with a cell, and a slave surface is an upper surface of the cell; analyzing grid convergence, and determining a grid size for calculation; extracting a relationship between the normal force and a displacement of the conical AFM probe;

2.2) performing an error analysis of the simulation results and the Sneddon model,
comparing the normal force of the conical atomic force microscope probe obtained from 2.1) with results of the Sneddon model at the same compression depth, and substituting into the following equation:

$$\delta = \frac{P - P_s}{P_s} \quad (2)$$

calculating a relative error in elastic modulus based on the Sneddon model fitting;
where, $\delta$ is the relative error in the elastic modulus of the cell based on the Sneddon model fitting, P is the normal force exerted on the conical AFM probe, and $P_s$ is the normal force exerted on the conical AFM probe calculated by the Sneddon model;
step 3, function fitting of the relative error calculated in the second step;
fitting the relative error of the conical AFM probe with different shape parameters calculated in step 2 as a function; finding that the relative errors have a linear relationship with a ratio between the curvature radius of the cone at the tip and the compression depth r/δ; further fitting the relative error $\delta$ as a polynomial function of r/δ and a, in which the highest exponential of r/δ is 1;
modifying the Sneddon model by the fitted relative error to obtain a modified formula;
step 4, measuring force displacement curves of human osteosarcoma cells (MG63) using the conical AFM probe with two shape parameters, using the Sneddon model and the modified formula to fit the elastic modulus of the human osteosarcoma cells, respectively; increasing the elastic modulus fitted by the Sneddon model with a decrease of the compression depth, wherein the elastic modulus fitted by the modified formula changes marginally with the compression depth; testing force displacement curves of polyvinyl alcohol (PVA) hydrogels with the conical AFM probe with the two shapes parameters, using the Sneddon model and the modified formula to fit the elastic modulus of the PVA hydrogels, respectively, and comparing with a macroscopic elastic modulus of the PVA hydrogels obtained from a macroscopic compression test on a testing machine, wherein the smaller the compression depth is, the greater an error between the elastic modulus fitted by the Sneddon model and the elastic modulus obtained by the macroscopic compression test, and wherein the elastic modulus fitted by the modified formula agrees with the elastic modulus obtained by the macroscopic compression test, and the error is independent of the compression depth.

* * * * *